United States Patent [19]

Chang

[11] 4,081,112
[45] Mar. 28, 1978

[54] CAULKING GUN

[76] Inventor: Peter J.Y. Chang, 7700 Tremayne Pl., McLean, Va. 22101

[21] Appl. No.: 731,730

[22] Filed: Oct. 12, 1976

[51] Int. Cl.² ............................................. G01F 11/02
[52] U.S. Cl. .................................................... 222/391
[58] Field of Search ............................... 222/325–327, 222/391

[56] References Cited
U.S. PATENT DOCUMENTS

| | | | |
|---|---|---|---|
| 1,986,166 | 1/1935 | Schneider | 222/325 |
| 2,530,359 | 11/1950 | Peterson | 222/391 X |
| 2,561,825 | 7/1951 | Sherbondy | 222/391 |
| 4,009,804 | 3/1977 | Costa et al. | 222/391 |

FOREIGN PATENT DOCUMENTS 217,894  9/1958  Australia ............................... 222/391

Primary Examiner—Kenneth H. Betts
Assistant Examiner—Norman L. Stack, Jr.
Attorney, Agent, or Firm—John F. McClellan, Sr.

[57] ABSTRACT

An improved caulking gun providing greater trigger-leverage and more nearly parallel trigger swing through location of the trigger pivot above the plunger shaft, a provision also providing maximum wear-point-access and oiling reminder, and simplifying fabrication and assembly together with a free-insert drive-grip spring, a self-pivoting release grip retained together with the counter-spring on the plunger shaft; subassembly requires only three welds for part securance and final assembly securance requires only one rivet and one upset-attachment.

5 Claims, 3 Drawing Figures

CAULKING GUN

This invention relates generally to tools and specifically to manually powered caulking guns.

Principal objects of the invention are to provide an improved caulking gun which is at the same time more effective in use, more durable and conducive to good maintenance, and more economical to fabricate and assemble than previous articles of the kind.

In the prior art various caulking guns have been described, as for example in the following U.S. Pat. Nos.:

1,986,166 to F. K. Schneider, Jan. 1, 1935
2,530,359 to W. P. Peterson, Nov. 14, 1950
2,561,825 to W. A. Sherbondy, July 24, 1951

Schneider discloses a caulking gun with outboard rearwardly mounted plunger release and forward trigger pivoted below the plunger shaft drive grip.

Peterson discloses a caulking gun with forward trigger pivoted below the plunger shaft drive grip and forward release.

Sherbondy discloses a caulking gun with forward trigger pivoted below the plunger shaft drive grip and plunger shaft release having a substantially horizontal control lever above the plunger shaft.

However neither these nor any other caulking guns are believed to provide the advantages of the present invention according to the above objects.

In brief summary of the invention given for cursive description only and not as limitation, the invention includes in a caulking gun the features of trigger pivot and trigger-to-drive grip engagement above a plunger shaft, and a minimum of parts and fabrication including final assembly securance involving only one rivet and one upset-attachment.

The above and other objects and advantages will become more readily apparent on examination of the following description, including the drawings, in which like reference numerals refer to like parts:

Figure 1:
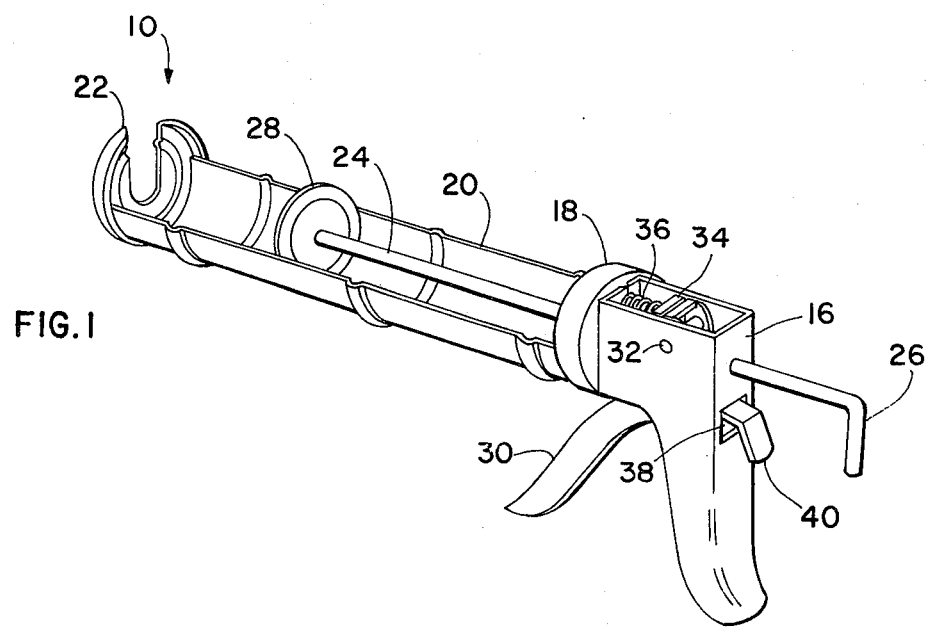
FIG. 1 is an isometric view.

FIG. 1 shows external features of the invention 10, which include a pistol-type handle 16 having a generally rectangular cross-section open at the top and bottom, with connection at the forward end to conventional structure including a butt cup 18 having a forwardly extending hemi-cylinder 20 terminating in a yoke 22. A plunger shank or plunger shaft 24 of circular cross-section passes horizontally through the upper portion of the handle and has at the rear end a substantially right-angle bend 26 and at the forward end a thrust disk 28 for urging caulking compound from a conventional cylindrical container (not shown) held between the butt cup and the yoke.

A trigger 30 forward of the handle has pivotal connection inside the handle above the plunger shank at a rivet 32 passing transversely through the handle. Clearly visible inside the handle at the top opening is the upper end of the trigger above the pivot, a first grip or plunger drive grip 34 in operational contact with the trigger at the rear and with a first spring 36, which is a compression spring resiliently wedged between the forward wall of the housing and the plunger drive-grip above the plunger shaft, the free length of the spring being greater than the spacing between these generally parallel elements.

An aperture 38 in the rear wall of the handle below the plunger shank loosely passes a manual-operation release 40 portion of a plunger pressure retainer grip located inside the handle with all other mechanism except the protruding ends of the trigger, release portion and plunger.

Figure 2:
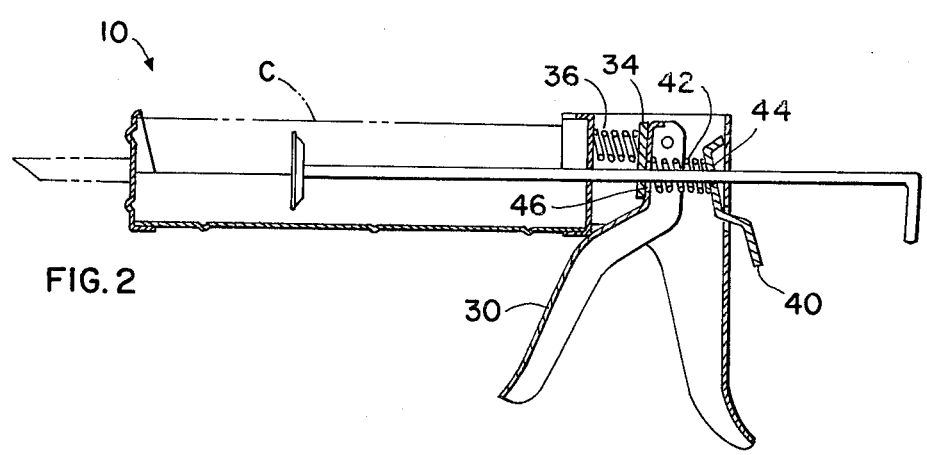
FIGS. 2 and 3 are side elevational views in section, showing successive operating positions.

FIG. 2 shows the relation of the interior parts of the mechanism before the trigger is depressed in a feeding cycle to expel caulking compound from a typical caulking container C (phantom lines).

A second compression spring 42 coaxially on the plunger shaft urges the rearwardly concave second grip 44 which surrounds the plunger shaft into contact with the rear wall of the handle and urges the trigger 30 forward to rest against the butt cup. The trigger has an aperture 46 passing the plunger shaft through it.

The first grip 34 surrounds the plunger shaft and has an upwardly extending portion which is the portion actuated at the top of the handle by the trigger. The grips cramp the plunger shaft in conventional manner, but oppositely, when canted relative to it, and respectively release it when perpendicular to it, the first under urging of the first spring and the second when manually actuated by the release portion.

Figure 3:
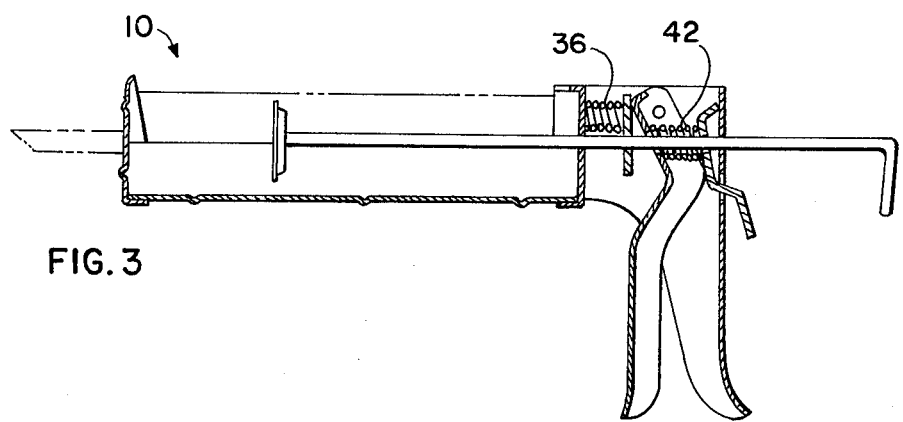

FIG. 3 shows the first grip cramped on and advancing the plunger shaft under thrust of the trigger against the arm provided by the upward extension of the grip, compressing first spring 36 which has a compressed length proportioned to stop the stroke when fully compressed and which extends to release the cramping and return the grip and trigger to the position of the previous Figure. It will be appreciated that the second spring 42 also urges the trigger to the initial stroke position.

Several advantageous features will be apparent. There are only six moving parts, two identical springs, two grips made from perforate flat plate, a trigger and a plunger. The great effective length of the trigger achieved by perforating it to pass the plunger and pivoting it high in the handle gives great mechanical advantage and a longer-radius, making the squeezing action required to advance the plunger more nearly parallel action. The high-load portion of the mechanism which should be kept lubricated for easy operation and longest wear is at the operative contact of the trigger with the first grip, and this is highly visible and readily accessible for inspection and oiling.

The plunger pressure release mechanism is freely pivoted about the plunger shaft and requires no adjustment or other attachment, being retained laterally between the side walls and bearing on the rear wall of the housing. The springs prevent the mechanism from rattling and the handle guards it from damage.

It is evident also that sub-assembly requires only three welds: yoke and butt cap to hemi-cylinder, and handle to butt cup, and one bend in the plunger shank.

Final assembly is also impressively simple, requiring only inserting the plunger shank through the hole in the handle, the second grip, the second spring, the trigger, the first grip, the butt cup and the thrust disk, then upsetting the end of the plunger shank to retain the thrust disk, and finally inserting the first spring, which as noted is simply held by friction.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be secured by United States letters patent is:

1. In a caulking gun having a frame, a plunger including a plunger shaft for forwardly urging caulking material, plunger driving means including: a handle, a trigger pivoted to the handle, a first grip and first spring, the first grip biased by the first spring and operable through the trigger for advancing the plunger, plunger-pressure retaining means including a second grip and second spring, the second grip biased by the second spring and having a portion operable for releasing plunger pressure, and the plunger having means thereon for manually retracting the plunger, the improvement comprising: the first grip encircling within the handle the plunger shaft and protruding upwardly beyond the plunger shaft to a location proximate the upper portion of the frame, the trigger extending upwardly in the handle to a trigger pivot located above the plunger shaft, a portion of the trigger above the pivot operatively contacting said first grip upward protrusion, said first spring oppositely biasing said trigger operative engagement, the handle having a forward wall, the first spring being a compression spring, and means for frictionally retaining the first spring in the spacing between the forward wall and the first grip, above the plunger shaft.

2. In a caulking gun as recited in claim 1, the handle having a rear wall with an opening therein, the second grip within the handle and encircling the plunger with said operable portion projecting through the opening and a rearwardly concave portion of the second grip extending upwardly to free contact with the rear wall interior, the second spring being on the plunger shaft and urging apart said trigger and second grip.

3. In a caulking gun as recited in claim 2, and means for stopping said trigger advancing of the plunger comprising said first spring having a length when fully compressed proportioned for stopping advance of said trigger.

4. In a caulking gun as recited in claim 1, the handle having an open top and said operative contacting of the trigger portion with the first grip being proximate to the open top.

5. In a caulking gun as recited in claim 1, the means for frictionally retaining the first spring in the spacing between the forward wall and the first grip comprising the free length of the first spring being greater than said spacing.

* * * * *